United States Patent
Li et al.

(10) Patent No.: US 9,255,413 B2
(45) Date of Patent: Feb. 9, 2016

(54) METHOD FOR PLASTERING CONSTRUCTION IN ARCHITECTURAL DECORATION

(71) Applicant: SHENZHEN GRANDLAND DECORATION GROUP CO., LTD., Guangdong (CN)

(72) Inventors: Shaoqiang Li, Guangdong (CN); Xiaozhen Zeng, Guangdong (CN); Huiyuan Pang, Guangdong (CN)

(73) Assignee: SHENZHEN GRANDLAND DECORATION GROUP CO., LTD., Guangdong (CN)

( * ) Notice: Subject to any disclaimer, the term of this patent is extended or adjusted under 35 U.S.C. 154(b) by 0 days.

(21) Appl. No.: 14/395,792
(22) PCT Filed: Nov. 2, 2012
(86) PCT No.: PCT/CN2012/083952
§ 371 (c)(1),
(2) Date: Oct. 20, 2014
(87) PCT Pub. No.: WO2013/155833
PCT Pub. Date: Oct. 24, 2013

(65) Prior Publication Data
US 2015/0059284 A1 Mar. 5, 2015

(30) Foreign Application Priority Data
Apr. 20, 2012 (CN) .......................... 2012 1 0118829

(51) Int. Cl.
*E04F 10/02* (2006.01)
*E04F 21/05* (2006.01)
(Continued)

(52) U.S. Cl.
CPC ............... *E04F 13/045* (2013.01); *E04F 21/04* (2013.01); *C04B 41/009* (2013.01); *E04F 13/047* (2013.01); *E04F 21/08* (2013.01); *E04F 21/16* (2013.01)

(58) Field of Classification Search
CPC ..... E04F 21/241; E04F 21/242; E04F 21/244; E04F 21/245; E04F 21/247; E04F 21/248; E04F 21/05; E04F 19/00; E04F 13/06

USPC .......... 52/443–448, 454, 364, 367, 372–375, 52/741.41, 514.5, 366, 365, 371; 425/470; 404/118, 119
See application file for complete search history.

(56) References Cited

U.S. PATENT DOCUMENTS 2,867,041 A * 1/1959 McMillan ........................ 33/228
3,834,107 A * 9/1974 Standing ............. E04G 23/0203
52/514

(Continued)

FOREIGN PATENT DOCUMENTS

CN 201095860 Y 8/2008
CN 201588390 U 9/2010
(Continued)

OTHER PUBLICATIONS

International Search Report of corresponding application PCT/CN2012/083952 mailed Feb. 14, 2013.
(Continued)

*Primary Examiner* — Elizabeth A Plummer
*Assistant Examiner* — Kyle Walraed-Sullivan
(74) *Attorney, Agent, or Firm* — Polster, Lieder, Woodruff & Lucchesi, L.C.

(57) ABSTRACT

A method for plastering construction in architectural decoration comprises the following steps: (1) base treatment; (2) applying mortar on the wall surface according to the required plastering depth, and longitudinally installing screeding templates along a wall surface subjected to the base treatment in Step (1) according to the plastering depth, a lateral space between adjacent screeding templates being 1.3 to 1.8 meters; (3) plastering; and (4) laying aside the wall surface subjected to the plastering for 12 to 24 hours till plastering mortar on the wall surface is in a half-dried compact hardened state, and using teeth of a saw blade for grinding the mortar along the two adjacent screeding templates through a ruler till the mortar is even. The method can improve the construction efficiency and guarantee the construction quality.

13 Claims, 7 Drawing Sheets

FIG. 1

(51) Int. Cl.
  *E04F 13/04* (2006.01)
  *E04F 21/04* (2006.01)
  *C04B 41/00* (2006.01)
  *E04F 21/16* (2006.01)
  *E04F 21/08* (2006.01)

(56) References Cited

U.S. PATENT DOCUMENTS

| | | | | |
|---|---|---|---|---|
| 4,158,937 | A | * | 6/1979 | Henry .............................. 52/365 |
| 4,371,330 | A | * | 2/1983 | Heffernan ..................... 425/458 |
| 4,702,641 | A | * | 10/1987 | Naser et al. ..................... 404/97 |
| 4,727,690 | A | * | 3/1988 | Honeyman ........................ 52/98 |
| 4,892,439 | A | * | 1/1990 | Kiefer ........................... 404/119 |
| 4,945,698 | A | * | 8/1990 | Jertberg et al. ................. 52/365 |
| 5,433,051 | A | * | 7/1995 | Johansson ....................... 52/367 |
| 5,607,256 | A | * | 3/1997 | McCleary ..................... 404/105 |
| 5,609,437 | A | * | 3/1997 | Silva ........................... 404/118 |
| 6,016,635 | A | * | 1/2000 | Shaw et al. ................. 52/741.41 |
| 6,314,695 | B1 | * | 11/2001 | Belleau ...................... 52/309.17 |
| 6,393,788 | B1 | * | 5/2002 | Flores ............................ 52/365 |
| 6,397,542 | B1 | * | 6/2002 | Flores ............................ 52/365 |
| 6,508,043 | B1 | * | 1/2003 | Bond et al. ................ 52/742.14 |
| 6,610,224 | B2 | * | 8/2003 | Sullivan .......................... 264/34 |
| 6,669,876 | B2 | * | 12/2003 | Torrance ......................... 264/34 |
| 7,396,187 | B1 | * | 7/2008 | Meyers ......................... 404/118 |
| 7,493,732 | B2 | * | 2/2009 | Brailsford et al. ............ 52/311.1 |
| 7,591,967 | B2 | * | 9/2009 | Palermo et al. .................. 264/34 |
| 7,878,469 | B2 | * | 2/2011 | Hasenoehrl et al. ..... 248/229.11 |
| 8,381,483 | B1 | * | 2/2013 | Goldman .................... 52/741.41 |
| 8,936,411 | B1 | * | 1/2015 | Shaw .............................. 404/75 |
| 2002/0063352 | A1 | * | 5/2002 | Torrance ......................... 264/34 |
| 2002/0157577 | A1 | * | 10/2002 | Sullivan ........................ 106/737 |
| 2004/0159073 | A1 | * | 8/2004 | Palermo et al. ............ 52/745.19 |
| 2009/0277127 | A1 | * | 11/2009 | Vasquez et al. ............ 52/741.11 |
| 2010/0139196 | A1 | * | 6/2010 | Healy ............................ 52/365 |
| 2014/0047789 | A1 | * | 2/2014 | Francavilla .................. 52/405.3 |
| 2014/0272147 | A1 | * | 9/2014 | Shaw ............................ 427/331 |

FOREIGN PATENT DOCUMENTS

| | | |
|---|---|---|
| CN | 101948289 A | 1/2011 |
| CN | 202090569 U | 12/2011 |
| CN | 102644362 A | 8/2012 |
| WO | 8906641 A2 | 7/1989 |

OTHER PUBLICATIONS

Deng, Zegui et al., "Plasterer", Chongquing University Press, Apr. 30, 2007, ISBN 9787562440895, pp. 4-58.

* cited by examiner

METHOD FOR PLASTERING CONSTRUCTION IN ARCHITECTURAL DECORATION

CROSS-REFERENCE TO RELATED APPLICATIONS

This application is a United States national phase application under 35 U.S.C. §371 of co-pending international patent application number PCT/CN2012/083952, filed on Nov. 2, 2012 and entitled "METHOD FOR PLASTERING CONSTRUCTION IN ARCHITECTURAL DECORATION", which claims the benefit of Chinese Patent Application No. 201210118829.2 filed on Apr. 20, 2012 and entitled "METHOD FOR PLASTERING CONSTRUCTION IN ARCHITECTURAL DECORATION", disclosures of which are incorporated herein by reference in their entirety.

FIELD OF THE INVENTION

The present invention relates to a method for plastering construction of an interior wall in architectural decoration.

BACKGROUND OF THE INVENTION

The existing plastering construction process for architectural decoration generally includes: base treatment; hanging vertically of a plumb; perpendicularity and flatness leveling; line positioning; application of plaster; constructing grinding guides on wall surfaces; manual plastering; filling of reserved holes, electric cabinet slots, electric cabinet boxes, and the like; scraping and trowelling; and waste recycling. The above existing construction process has the following disadvantages:

(1) The traditional process of constructing grinding guides on wall surfaces is very demanding for the skills of a plasterer. In the case of plastering construction by an unskilled worker, the speed of the plaster application is lowered, and it is difficult to guarantee a high precision of constructing screed strips on the wall surface, resulting in uneven wall surfaces (i.e., wall surfaces that are not sufficiently flat or level) and the resulting undesired visual effect of the wall itself. Moreover, the screed strip construction process cannot match a mechanized construction process, leading to difficulties in significantly improving the construction efficiency.

(2) During trowelling of the wall surface after the manual plastering or mechanical mortar spraying, due to the rotary grinding of a wooded trowel, the collision and squeeze occurring within the mortar causes the moisture in the mortar to exude from the mortar. Because of the moisture loss from the mortar to brick bodies of the wall in contact with the mortar, the moisture in the mortar is absorbed prematurely, thus the mortar shrinks and hence the wall surface plumps up (expands), causing phenomena such as cracks in the wall surface and peeling off of the mortar. Moreover, the construction schedule is prolonged since the above processes rely on numerous technical personnel and are time consuming, and the construction efficiency is lowered since the construction processes are fussy and complicated.

SUMMARY OF THE INVENTION

A technical problem to be solved by the present invention is to provide a method for plastering construction, which improves the efficiency of plastering construction and guarantees high construction quality, without dependency on a technique level of construction personnel, and may further cooperate with mechanized construction.

In order to solve the above problems, the present invention provides a method for plastering construction in architectural decoration, including steps of:
(1) base treatment;
(2) grinding guide construction;
(3) plastering; and
(4) wall surface grinding.

The step (2) of grinding guide construction comprises: positioning alignment wires according to an intended depth of applied plaster, and installing grinding guide templates longitudinally along a wall surface treated by the base treatment step (1) according to a distance between the alignment wire and the wall surface, wherein a transverse interval between the adjacent grinding guide templates is 1.3 m to 1.8 m.

The step (4) of wall surface grinding comprises: allowing the wall surface treated by the plastering step (3) to rest for 12 hours to 24 hours until the plastered mortar on the wall surface is semi-dry and compact and at a solidified state, after which the mortar is ground to be flat by saw teeth of a running rule with saw blade abutting against the mortar along two adjacent grinding guide templates.

The base treatment in step (1) includes: cleaning and drying a wall surface; applying mortar on the wall surface; attaching a stretched fiberglass mesh over the mortar at the time of pre-hardening of the mortar, and pressing the fiberglass mesh into the mortar until the fiberglass mesh is slightly visible; applying mortar over the fiberglass mesh to completely cover the fiberglass mesh; and allowing the mortar to solidify.

The plastering of step (3) includes mechanically spraying mortar, which includes: spraying water on the wall surface after the grinding guide construction; spraying plastering mortar to the wall surface with a mortar spraying machine until the grinding guide templates are basically covered but slightly visible; scraping the wall surface using a common running rule abutting against the grinding guide templates; and manually repairing and leveling the reserved holes or reserved positions.

The grinding guide template in the step (2) includes a base configured to be connected to the wall surface, a grinding guide board and a connecting rod for connecting the base with the grinding guide board; the base is provided with an installation through-hole for receiving one end of the connecting rod in a direction perpendicular to the base; a side of the grinding guide board, which is close to the wall surface, is provided with a clamping slot configured to perpendicularly receive the other end of the connecting rod along a longitudinal direction, and the grinding guide board is connected with at least two bases via at least the connecting rods.

The grinding guide templates are installed by: adhering the bases of the grinding guide templates longitudinally on the wall surface by using glue, with the adjacent bases being spaced by an interval of 50 cm; inserting one end of each connecting rod into the installation through-hole of the bases, cutting the connecting rod so that it has a length corresponding to a distance between the alignment wire and the wall surface, and aligning the clamping slot with the connecting rod and pressing the clamping slot on to the connecting rod.

The base of the grinding guide template is integrally formed by a smaller round disc and a bigger round disc which is coaxial with the smaller round disc and which is configured to connect with the wall surface; the installation through-hole in the base is coaxial with the bigger round disc and the smaller round disc; an end of the installation through-hole, which is close to the grinding guide board, is provided with a clamping jaw protruding towards the center of the installation through-hole.

Four auxiliary through-holes are evenly distributed in circumferentially about the bigger round disc; the grinding guide board is integrally formed by a folded plate symmetrically folded about a longitudinal direction and the clamping slot; the clamping slot is disposed on an inner concave surface of a corner of the folded plate and extends along the longitudinal direction; and both lateral sides of the folded plate are respectively provided with a plurality of through-holes distributed along the longitudinal direction of the screed board.

A plurality of closed annular dents, which are in planes perpendicular to the longitudinal direction of the connecting rod, are evenly distributed on the connecting rod along the longitudinal direction.

The running rule with saw blade in step (4) includes a saw blade that is provided with the saw teeth along the longitudinal direction and a clamping part connecting with the saw blade.

A cross-sectional shape of the clamping part approximately defines an isosceles triangle, the clamping part extends at its vertex as two clamping plates for clamping the saw blade, the clamping plates and the saw blade are tightened by a bolt, and the clamping part matches the saw blade in length.

A length of the saw blade is 1.7 m to 2.3 m; a distance between the saw teeth and a proximal end of the clamping plate is 30 mm to 70 mm; a width of a clamped part of the saw blade is 40 mm to 60 mm; and a width of an end surface of the clamping part, which is away from the saw blade, is 2 cm.

The grinding guide apparatus used for constructing the grinding guide of the method for the plastering construction in architectural decoration is convenient to install and use, and has a lower technical requirement on the construction personnel, while guaranteeing both the perpendicularity and the flatness of the wall surface and avoiding the dependence on the technical experiences of the construction personnel. Further, the grinding guide apparatus may remain inside the wall rather than being taken out from the wall after the grinding guide construction is finished, thereby avoiding repairing at an original position of the grinding guide, reducing the working procedures and improving the efficiency. Also, the grinding guide apparatus may cooperate with a mechanized mortar spraying operation, thereby improving the plastering efficiency. After the mechanized mortar spraying is finished, the existing manual trowelling is avoided, the plastered mortar on the wall surface rests for 12 hours to 24 hours until the plastered mortar on the wall surface is semi-dry and compact and at a solidified state, so that the problem of plumping up of the wall surface can be solved by utilizing the natural solidification of the mortar, and then the mortar is ground flat using the running rule with saw blade. Compared with the manual trowelling, the running rule with saw blade can implement grinding at a larger area and hence is suitable for large-area construction. The running rule with saw blade is simple and convenient in operation, and has a low requirement on a technical merit and a less requirement on the quantity of the construction personnel.

BRIEF DESCRIPTION OF THE DRAWINGS

The present invention is described in detail below with reference to the accompanying drawings and embodiments.

DETAILED DESCRIPTION OF THE INVENTION

Figure 7:
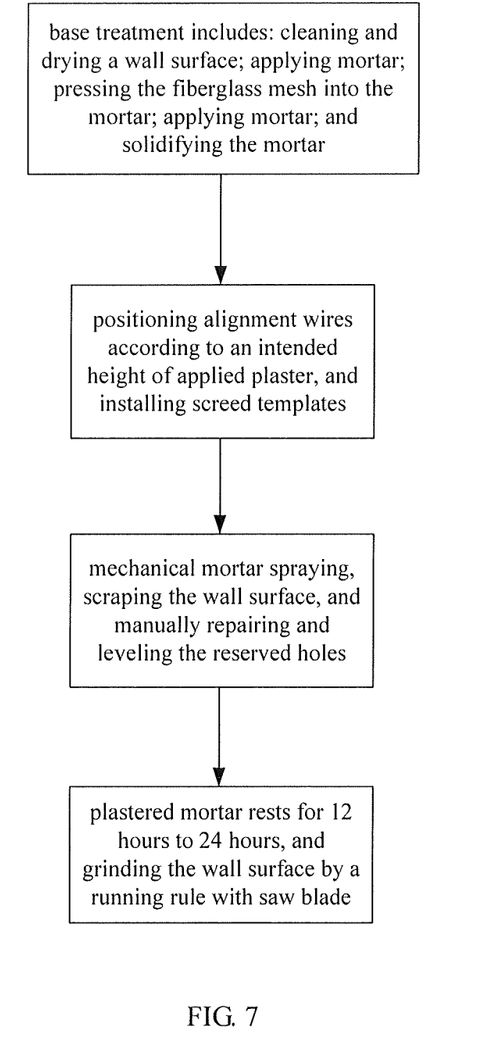
FIG. 7 is a flow chart of a method for plastering construction in architectural decoration according to the present invention.

The present invention introduces newly designed tools, i.e. a grinding guide template and a running rule with a saw blade. The use of the grinding guide template improves the efficiency of forming grinding guides, and lowers requirements for the technique level of the construction personnel. The use of the running rule with a saw blade to grind the wall surface can effectively solve the issues associated with plumping up of the wall surface, and also lowers the requirements for the technique level and quantity of the construction personnel due to the easy usage of the running rule with a saw blade, which has significant meanings on saving labor costs and time costs. FIG. 7 is a flow chart of a method for plastering construction in architectural decoration according to the present invention.

The method for the plastering construction in architectural decoration according to the present invention includes the following processes of: base treatment, grinding guide construction, mechanical spraying of mortar and wall surface grinding.

In the existing base treatment, a steel mesh for preventing cracking is fixed on the wall using nails, which are covered with plastered mortar. However, both the nails and the steel mesh remain on the wall and are likely to rust, which may damage or mar the wall surface. In order to avoid the rusting of the nails for fixing the steel mesh, the present invention provides a way of burying a fiberglass mesh with mortar, which can better guarantee that the wall surface after plastering construction is reliable and durable and has thermal insulation and waterproof properties, such that the traditional way of fixing the steel mesh using nails is avoided. In this way, the problem of rusting of the nails can be solved, and cracks of the wall surface are prevented.

The method starts with a base treatment of the wall to be plastered. The base treatment process/step includes: (1) cleaning and drying a wall surface; (2) applying mortar on the wall surface; (3) attaching a stretched fiberglass mesh on the mortar at the time of pre-hardening of the mortar, and pressing the fiberglass mesh into the mortar until the fiberglass mesh is slightly visible; (4) applying mortar on the fiberglass mesh to completely cover the fiberglass mesh; and (5) letting the mortar solidify or set.

The fiberglass mesh has good chemical stability and is alkali-resistant, acid-resistant, waterproof, and cement corrosion resistant; it has good physical properties such as high strength, high modulus, and light weight; and it has good size stability such as rigidness, flatness, good shrinkage and deformation resistance, and excellent positioning property. The fiberglass mesh also has properties of thermal insulation, electrical insulation, and crack resistance. Moreover, a mesh size of the fiberglass mesh may be 5 mm×5 mm and a length of a single fiberglass mesh is generally no more than 6 meters. To join adjacent fiberglass meshes, a width of the overlapping portion of the fiberglass meshes shall be at least 10 cm. To press the fiberglass mesh into the mortar in step (3) of the base treatment, a trowel is used to flatly and firmly press the fiberglass mesh into the surface layer of the mortar from the center of the fiberglass mesh to its periphery. Folds of the pressed fiberglass mesh shall be avoided. The mortar should not be kneaded continuously to avoid plumping up of the wall surface.

After the mortar is hardened, the grinding guide construction begins.

Figure 1:
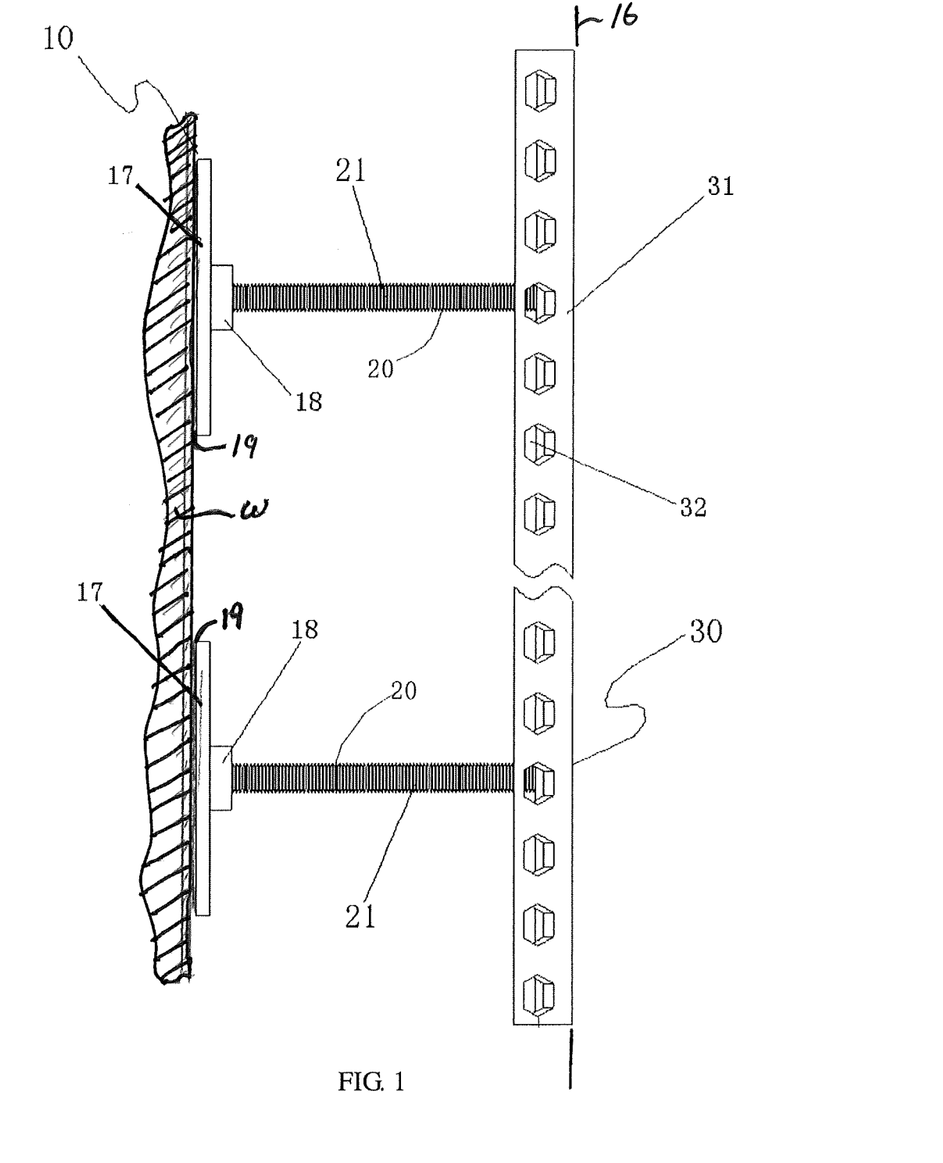
FIG. 1 is a front view of a grinding guide template used in a step of grinding guide construction according to the present invention.
Figure 2:
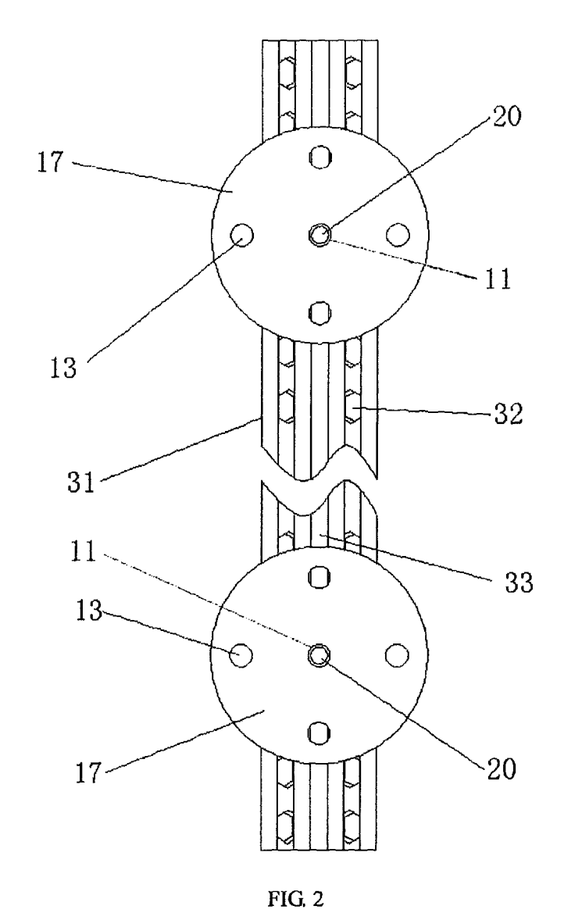
FIG. 2 is a broken, left elevational view of the grinding guide template used in the step of grinding guide construction according to the present invention.
Figure 3:
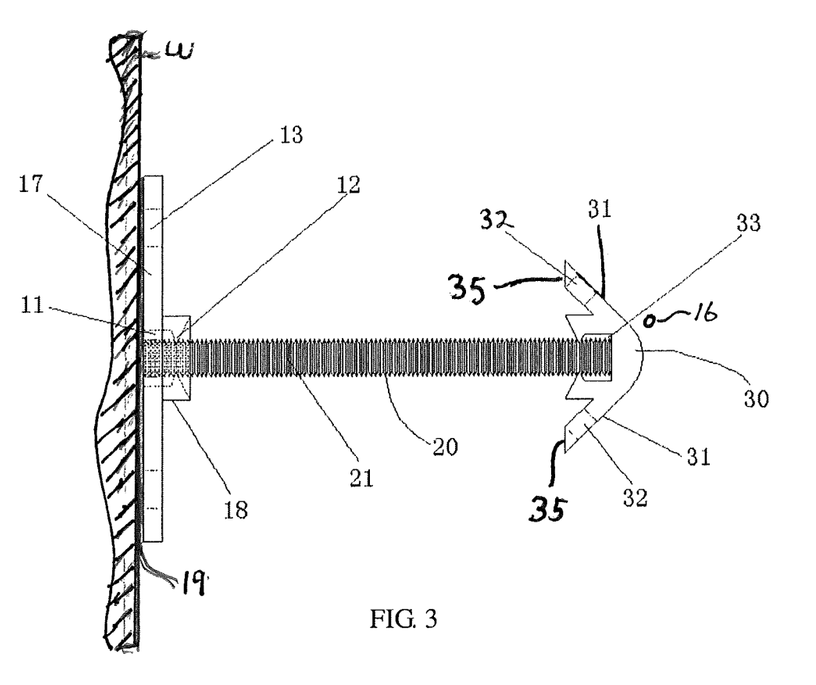
FIG. 3 is a schematic top sectional view of the grinding guide template used in the step of grinding guide construction according to the present invention.

As illustrated in FIGS. 1-3, a grinding guide template used for the grinding guide construction includes a base 10 configured to be fixed on a wall surface, a grinding guide board 30, and a connecting rod 20 for connecting the base 10 with the grinding guide board 30. The same grinding guide board 30 can connect with at least two bases 10 via at least two connecting rods 20. Preferably, the base 10, the grinding guide board 30 and the connecting rod 20 each are integrally made from recycled plastics so as to save costs and be environmentally friendly, or made of other materials.

The base 10 is provided with an installation through-hole 11, in which the connecting rod 20 can be inserted in a direction perpendicular to the base 10. In order to install the connecting rod 20 on the base 10 more firmly, the base 10 is integrally formed of a smaller round disc 18 and a bigger round disc 17 which is coaxial with the smaller round disc 18 and configured to connect with the wall surface. The installation through-hole 11 is coaxial with the bigger round disc 17 and the smaller round disc 18. An end of the installation through-hole 11, which is close to the grinding guide board 30, is provided with a clamping jaw 12 which extends from a surface of the bigger round disc 17 which is adjacent the wall and extends toward the center of the installation through-hole 11. As illustrated in FIG. 3, the clamping jaw 12 is used for fixing the connecting rod 20 perpendicularly to the base 10. The bigger round disc has a diameter of 60 mm and a height from 1 mm to 2 mm, and the smaller round disc has a diameter of 9 mm and a height of 3 mm. When the grinding guide construction begins, the base 10 is stuck on the wall surface by connecting the bigger round disc 17 to the wall surface. Due to the different conditions of the wall surfaces, the bigger round disc 17 is provided with at least one auxiliary through-hole 13 which may have a round shape or other shape, in order to stick the base 10 on the wall surface more firmly. Preferably, a plurality of auxiliary through-holes 13, for example four auxiliary through-holes as illustrated in FIG. 2, are disposed evenly and circumferentially around the bigger round disc 17.

The grinding guide board 30 is used for indicating the intended height of applied plaster. A side of the grinding guide board 30, which is close to the wall surface in use, is provided with a clamping slot 33 configured to perpendicularly receive the connecting rod 20. The grinding guide board 30 is integrally formed by a strip or plate 31 symmetrically folded about a longitudinal direction of the grinding guide board 30 and the clamping slot 33. The folded plate 31 is bent by an angle of 90 degrees or 60 degrees or other angles. The clamping slot 33 is disposed on an inner concave surface of a corner of the folded plate 31 and extends along the longitudinal direction. In order to prevent plumping up due to a gap between the clamping slot 33 and the folded plate 31, both lateral sides of the folded plate 31 are respectively provided with a plurality of through-holes 32 evenly distributed along the longitudinal direction. As shown in FIG. 1 and FIG. 2, the through-holes 32 are hexagonal in shape. The mortar can be filled between the clamping slot 33 and the folded plate 31 via the through-holes 32. End surfaces 35 on both sides of the folded plate 31, which are close to the base 10, and an opening end 36 of the clamping slot 33 are in the same plane. The folded plate 31 has a thickness from 1 mm to 2 mm, and has a width from 1 cm to 2 cm.

A plurality of closed annular dents (i.e. grooves) 21, which are in planes perpendicular to the longitudinal direction of the connecting rod 20, are evenly distributed longitudinally along the connecting rod 20. As illustrated in FIG. 3, one end of the connecting rod 20 is perpendicularly inserted into the installation through-hole 11 of the base 10, so that the clamping jaw 12 clamps the dent 21 on the connecting rod 20 to fix the connecting rod 20, and the other end of the connecting rod 20 is perpendicularly inserted into the clamping slot 33 of the screed board 30, so that the clamping slot 33 clamps the dent 21 on the connecting rod 20 to fix the connecting rod 20 to the base 10 and the grinding guide board 30. For the grinding guide construction, the connecting rod 20 can be cut or shortened to have a desired length depending on the intended thickness of the applied plaster.

A process of constructing the grinding guide includes: positioning alignment wires according to an intended height (i.e., depth) of applied plaster; adhering the bases 10 to the wall surface W applied with the mortar with glue 19 along a longitudinal direction, with the adjacent bases 10 being spaced by an interval of 50 cm; inserting one end of each connecting rod 20 into the installation through-hole 11 of one of the bases 10, shearing the connecting rod 20 to have a length corresponding to a distance between the alignment wire and the wall surface, and pressing the clamping slot 33 after aligning the clamping slot 33 with the other end of the connecting rod 20, so that the grinding guide templates are mounted at an interval of 1.3 m to 18 m transversely.

The grinding guide construction operation has a lower technical requirement on the workers. The grinding guide template has a simple structure which allows for it to be easily installed, such that the whole grinding guide construction operation can be completed without needing any other tools or mortar materials. Since the grinding guide templates are close to one another, the height of the applied plaster is easy to adjust and unify, such that the construction efficiency is improved. Thus, the height of the applied plaster will not be negatively affected by techniques of the workers or the deformation of mortar and the grinding guides caused by collisions. The base 10, the connecting rod 20 and the grinding guide board 30 each are integrally formed from recycled plastics, which not only protects the environment, but also saves cost without public hazards and pollutions, resulting in public benefit effects of "green building". The base, the connecting rod and the grinding guide board can be buried in the applied plaster after the plastering is finished, thereby simplifying the process and reducing the construction time. In the prior art, the plastering cannot be implemented until 2 hours after the grinding guides have been constructed, while in the present method, the plastering can be implemented immediately after the grinding guide constructing is finished, thereby improving the construction efficiency.

After the grinding guide construction is finished, next step of plastering is implemented. Either manual plastering or mechanical mortar spraying can be employed in the plastering step. The mechanical mortar spraying is implemented in the embodiment of the present invention.

The process of the mechanical mortar spraying includes: spraying water on the wall surface after the grinding guide construction; spraying the plastering mortar to the wall surface with a mortar spraying machine until the grinding guide templates are basically covered but slightly visible; scraping the wall surface with a common running rule abutting against the grinding guide templates; and manually repairing and leveling the reserved holes or reserved positions such as an electric cabinet, an electric cabinet slot, an electric cabinet box and the like.

A mortar spraying machine of a TURBOSOL POLIT type is used for the mechanical mortar spraying in the disclosed embodiment. The mortar can be directly applied on the wall surface subjected to the base treatment via the mortar spraying machine, a delivery pipe and a spray nozzle. A thickness of the sprayed mortar is just sufficient to basically cover the grinding guide templates but to keep the grinding guide templates slightly visible. Each time scraping the wall surface using the common running rule abutting against the grinding guide templates, the redundant materials can be recycled. The vacant wall surface can be manually repaired by the workers or repeatedly sprayed by the spraying machine. The above steps may be repeated to guarantee the sufficient mortar spraying. The mortar protruding slightly can achieve a better effect, and vacancy in the wall surface shall be avoided as possible.

Manual plastering requires a large number of technical personnel and takes a long construction time, which influences the construction schedule. In addition, the construction process is fussy and complicated, which influences the construction efficiency.

Compared with the manual plastering, the mechanical mortar spraying greatly improves the efficiency of the mortar application and is suitable for large-area construction. Thus, the current method reduces the requirement on the quantity of the construction personnel and reduces the labor cost.

As a difference from the prior art, a manual trowelling procedure in the plastering operation is cancelled and the step of grinding the wall surface is added in the present method. The plasticity of the plastered mortar is strong when the plastering is finished because the plastered mortar is in a pre-hardening state. During the manual trowelling process, due to the rotary grinding of a wooded trowel, the collision and squeeze occurred within the mortar causes the moisture in the mortar to exude from the mortar. Because of the moisture loss from the mortar to brick bodies of the wall in contact with the mortar, the moisture in the mortar is absorbed prematurely, thus the mortar shrinks and hence the wall surface plumps up, causing phenomena such as cracks in the wall surface and peeling off of the mortar. Therefore, in the present invention, the plastered mortar on the wall surface rests for 12 hours to 24 hours until the plastered mortar on the wall surface is semi-dry and compact and at a solidified state, so that the problem of plumping up of the wall surface can be solved by utilizing the natural solidification of the mortar, and then the mortar is ground using the running rule with saw blade. Compared with the manual trowelling, the running rule with saw blade can implement grinding of a larger area and hence is suitable for large-area construction. The running rule with saw blade is simple and convenient in operation, and has a low requirement on a technical merit and does not require many construction personnel. Further, the plumping up can be better avoided. The grinding operation can be implemented by either manual plastering or mechanical mortar spraying.

Figure 4:
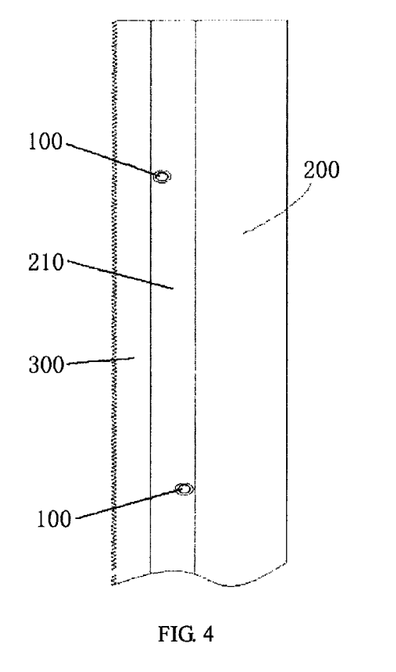
FIG. 4 is a front view of a running rule with saw a blade used in a step of wall surface grinding according to the present invention.
Figure 5:
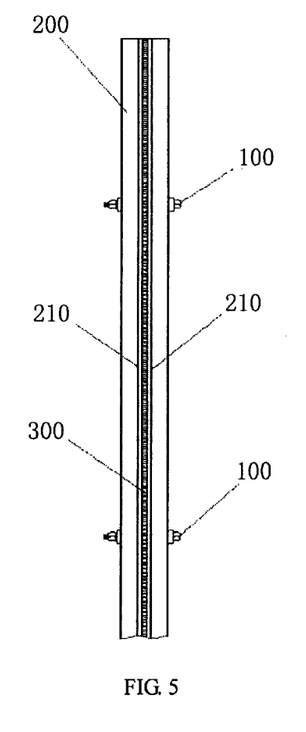
FIG. 5 is a left view of the running rule with a saw blade used in the step of wall surface grinding according to the present invention.
Figure 6:
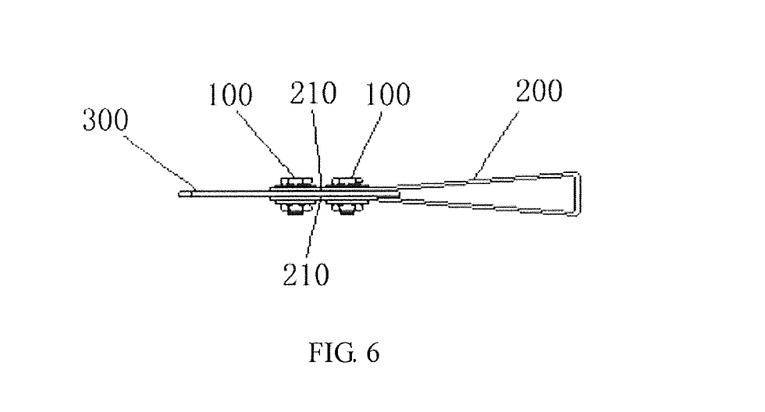
FIG. 6 is a bottom view of the running rule with a saw blade used in the step of wall surface grinding according to the present invention.

FIGS. 4-6 illustrate structural views of the running rule with saw blade used for grinding the wall surface, and the running rule with saw blade includes a saw blade 300, a clamping part 200 for clamping the saw blade 300, and a bolt 100 for fastening the saw blade 300 and the clamping part 200 together. Teeth, which may be general teeth, are disposed along the longitudinal direction of the saw blade 300. The length of the saw blade 300 is 1.7 m to 2.3 m, preferably, 2 m in the embodiment, so as to match with the grinding guide templates arranged at an interval of 1.3 m to 1.8 m. The width of the saw blade 300 is 0.1 m to 0.2 m, and the thickness of the saw blade 300 is 1 mm.

For ease of the construction, the clamping part 200 of the running rule is connected to a side of the saw blade 300, which is opposite to the teeth, and is disposed along the longitudinal direction. Preferably, the length of the clamping part 200 matches with the length of the saw blade 300. A cross-sectional shape of the clamping part 200 approximates an isosceles triangle. The clamping part 200 may be formed from an aluminum alloy plate, and the clamping part extends at its apex as two clamping plates 210 for clamping the saw blade 300. The bottom side of the clamping part 200, that is, an end surface of the clamping part 200 which is away from the saw blade 300, has a width of 2 cm, so that the clamping part 200 is convenient for griping by a worker. A distance between the teeth of the saw blade 300 and the end of the clamping plate 210 is 30 mm to 70 mm, and a width of a part of the saw blade 300, which is clamped by the clamping plates 210, is 40 mm to 60 mm. In the embodiment, the whole width of the saw blade 300 is 0.1 m, a distance between the teeth of the saw blade 300 and a proximal end of the clamping plate 210 is 50 mm, and a width of the part of the saw blade 300 which is clamped is 50 mm.

To fix the saw blade 300 between the clamping plates 210 of the clamping part 200, at least two bolts 100 (cooperate with corresponding nuts) are needed for fastening the clamping plates 210 and the saw blade 300 to clamp the saw blade 300. As illustrated in FIG. 4, two bolts 100 are respectively disposed at two ends of the clamping part 200, and one of the two bolts 100 is close to the teeth and the other one is away from the teeth, thereby achieving the fixation purpose.

A wall surface grinding process is as follows: after the mechanical mortar spraying is finished, the plastered mortar rests for 12 hours to 24 hours until the plastered mortar is semi-dry and compact and at a solidified state, subsequently the construction personnel can grip the clamping part 200 to grind the mortar along two neighboring grinding guide templates from bottom to top, where the teeth abuts against the plastered mortar and the saw blade 300 inclines to the wall surface by an angle in the range from 30 degrees to 60 degrees.

Upon inspection, both the flatness of the wall surface and perpendicularity at internal and external corners of the wall meet the national standards. Moreover, plumping up, cracks and watermarks do not occur to the wall surface.

What is claimed is:

1. A method for plastering construction in architectural decoration, comprising steps of:
   (1) base treating a wall to be plastered;
   (2) constructing a grinding guide and adhering the grinding guide to the wall, the grinding guide comprising alignment wires spaced from the wall and a grinding guide template, said grinding guide template mounted to the wall and comprising a board to be spaced from the wall and having an outer surface which is generally parallel to the wall;
   (3) plastering the wall after the grinding guide has been secured to the wall with plaster to a depth corresponding at least to a depth of the grinding guide; and
   (4) grinding plaster on the wall;
   wherein, the step (2) of constructing the grinding guide comprises: positioning said alignment wires along the wall at a distance from the wall corresponding to an intended depth of plaster to be applied to the wall, and installing said grinding guide template along the wall treated in step (1) according to a distance between the alignment wire and the wall; and wherein, the step (4) of grinding the plaster applied to the wall in step (3) comprises: allowing the plaster on the wall to rest until the plaster on the wall is partially dried and compact and in a solidified state, and then grinding the plaster flat using saw teeth of a running rule with a saw blade abutting against the plaster along two adjacent grinding guide templates.

2. The method of claim 1, wherein, the base treating of step (1) comprises: cleaning and drying the wall to be plastered; applying plaster on the wall; attaching a stretched fiberglass mesh on the plaster at a time of pre-hardening of the plaster, pressing the stretched fiberglass mesh into the plaster; and applying plaster on the stretched fiberglass mesh to completely cover the stretched fiberglass mesh; and solidifying the plaster.

3. The method of claim 1, wherein, the plastering step (3) comprises mechanical plaster spraying; the mechanical plaster spraying comprising spraying water on the wall after the grinding guide constructing step (2); spraying plaster on the wall using a plaster spraying machine until the grinding guide templates are covered; scraping the wall with a common running rule abutting against the grinding guide templates; and manually repairing and leveling reserved holes or reserved positions.

4. The method of claim 1, wherein the grinding guide template comprises a base configured to be connected with the wall, said board and a connecting rod for connecting the base with the board; the base being provided with an installation through-hole for receiving one end of the connecting rod in a direction perpendicular to the base; a side of the board facing the wall being provided with a clamping slot configured to perpendicularly receive the other end of the connecting rod along a longitudinal direction of the board, and the board being connected to the wall with at least two bases via at least the connecting rods.

5. The method of claim 4, wherein the grinding guide templates are installed by adhering the at least two bases along the wall using glue, with adjacent bases being spaced from each other by an interval of 50 cm; inserting one end of each connecting rod into the installation through-hole of one of the bases, shearing the connecting rod to a length corresponding to a distance between the alignment wires and the wall, and securing the board to the connecting rod by pressing the clamping slot of the board onto the connecting rod after aligning the clamping slot with the other end of the connecting rod.

6. The method of claim 4, wherein the base is integrally formed from a first round disc and a second round disc which is bigger than, and coaxial with, the first round disc and configured to connect with the wall; the installation through hole is coaxial with the second round disc and the first round disc; an end of the installation through-hole facing the board being provided with a clamping jaw protruding towards a center of the installation through-hole; four auxiliary through-holes being evenly distributed in a circumferential direction on the second round disc; the board being integrally formed from a folded plate or strip symmetrically folded about a longitudinal direction of the plate or strip and about the clamping slot; the clamping slot being disposed on an inner concave surface of a corner of the folded plate or strip and extending along the longitudinal direction of the plate or strip; and both lateral sides of the folded plate or strip being respectively provided with a plurality of through-holes distributed longitudinally along the plate or strip.

7. The method of claim 4, wherein, a plurality of closed annular dents, which are in planes perpendicular to the longitudinal direction of the connecting rod, are evenly distributed on the connecting rod along the longitudinal direction of the connecting rod.

8. The method of claim 1, wherein, the running rule with saw blade in step (4) comprises a saw blade that is provided with the saw teeth along the longitudinal direction and a clamping part connecting with the saw blade.

9. The method of claim 7, wherein, the clamping part of the running rule has a cross-sectional shape which approximates an isosceles triangle, the clamping part having two clamping plates extending from an apex thereof for clamping the saw blade, the clamping plates and the saw blade being tightened together by a bolt, and the clamping part matches the saw blade in length.

10. The method of claim 7, wherein, a length of the saw blade is 1.7 m to 2.3 m; a distance between the saw teeth and a proximal end of the clamping plate is 30 mm to 70 mm; a width of a clamping part of the saw blade is 40 mm to 60 mm; and a width of an end surface of the clamping part, which is away from the saw blade, is 2 cm.

11. The method of claim 1 wherein the step of adhering the grinding guides to the wall comprises adhering the grinding guides with a transverse interval between the adjacent grinding templates of 1.3 m to 1.8 m.

12. The method of claim 1 wherein, in step (4), the plaster rests for 12 hours to 24 hours before the step of grinding the mortar is performed.

13. A method for plastering construction in architectural decoration, comprising steps of:
 (1) base treating a wall to be plastered;
 (2) constructing a grinding guide and adhering the grinding guide to the wall; said grinding guide comprising alignment wires and grinding guide templates; the grinding guide templates each comprising a base configured to be connected to the wall, a guide board and a connecting rod for connecting the base with the guide board; the base being provided with an installation through-hole for receiving one end of the connecting rod in a direction perpendicular to the base; a side of the guide board facing the wall being provided with a clamping slot configured to perpendicularly receive the other end of the connecting rod along a longitudinal direction of the screed guide board, and the screed guide board being connected to the wall with at least two bases via at least the connecting rods;
 (3) plastering the wall after the grinding guide has been secured to the wall to a depth corresponding at least to a depth of the grinding guide; and
 (4) grinding the plaster that has been applied to the wall; wherein, the step (2) of constructing the grinding guide comprises: positioning said alignment wires along the wall at a distance from the wall corresponding to an intended depth of plaster to be applied to the wall, and installing said grinding guide templates along the wall treated in step (1) according to a distance between the alignment wire and the wall; and wherein, the step (4) of grinding the plaster applied to the wall comprises: allowing the plaster to rest until the plaster on the wall surface is partially dried and compact and in a solidified state, and then grinding the plaster flat using saw teeth of a running rule with a saw blade abutting against the plaster along two adjacent grinding guide templates.

* * * * *